Nov. 26, 1940.  F. E. MILLER  2,223,043
AUTOMATIC SLACK ADJUSTER
Filed March 16, 1938  2 Sheets-Sheet 1
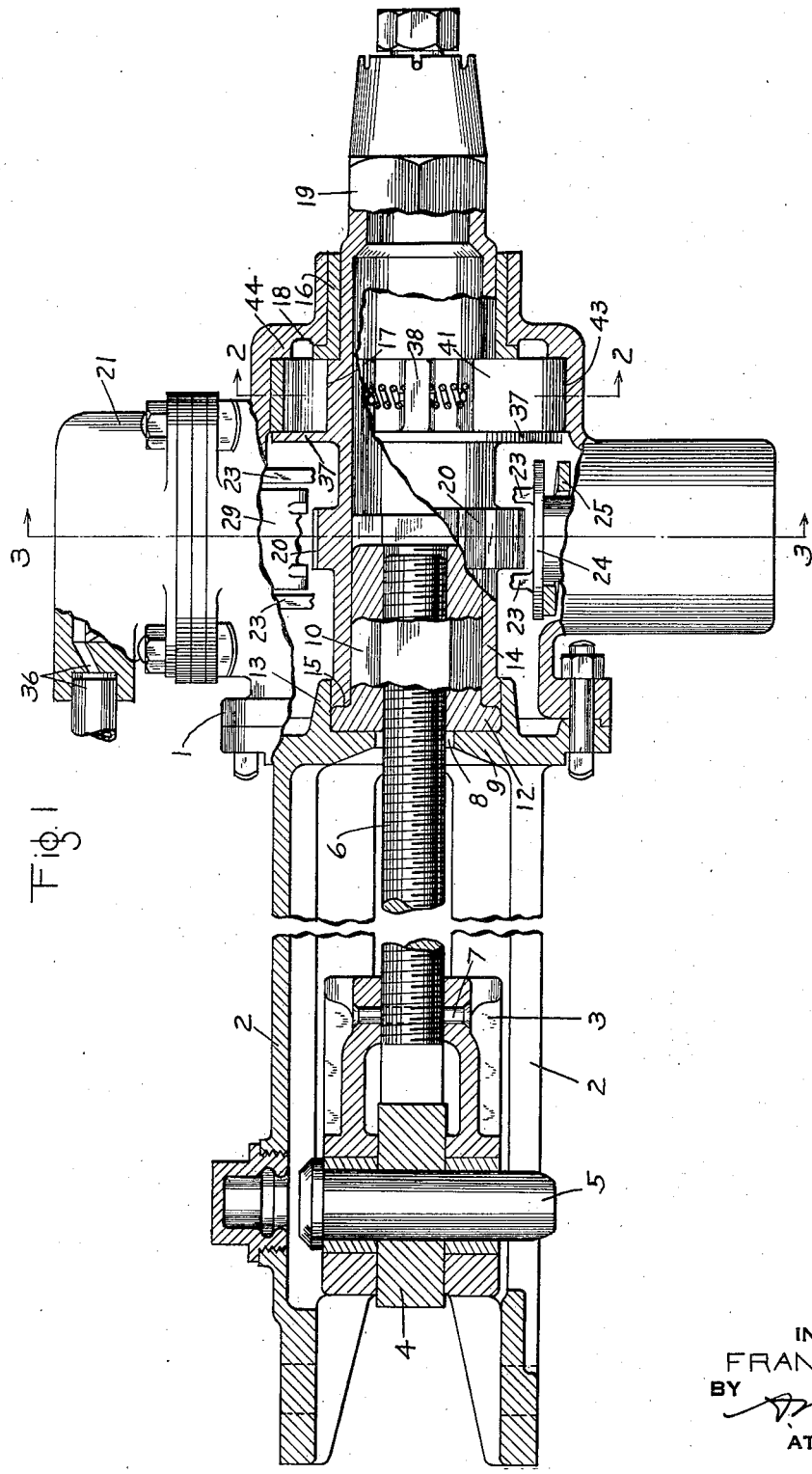
INVENTOR
FRANK E. MILLER
BY
ATTORNEY Nov. 26, 1940.  F. E. MILLER  2,223,043
AUTOMATIC SLACK ADJUSTER
Filed March 16, 1938  2 Sheets-Sheet 2
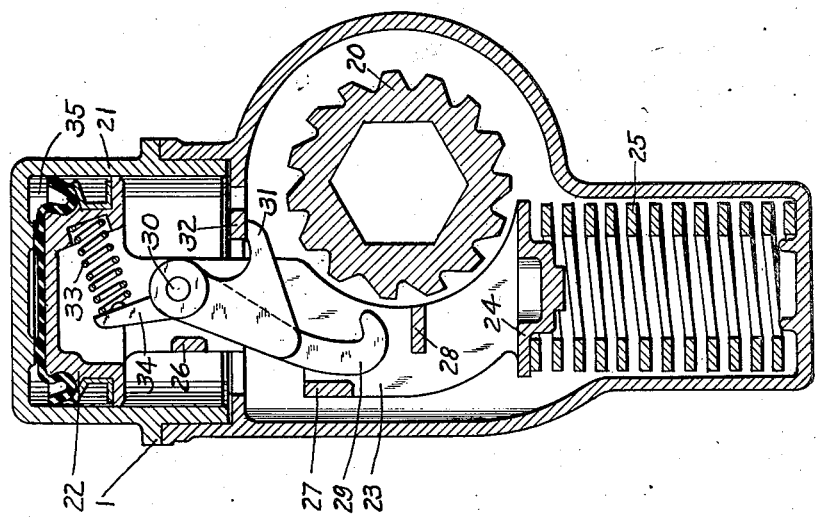
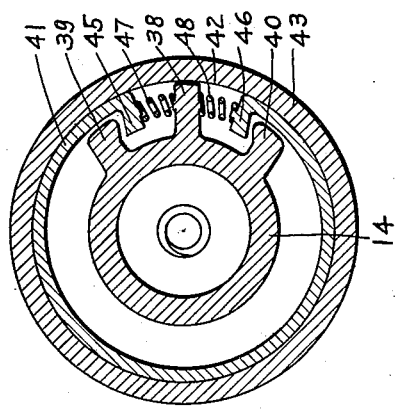
INVENTOR
FRANK E. MILLER
BY
ATTORNEY Patented Nov. 26, 1940

2,223,043

UNITED STATES PATENT OFFICE 2,223,043

AUTOMATIC SLACK ADJUSTER

Frank E. Miller, Swissvale, Pa., assignor to The Westinghouse Air Brake Company, Wilmerding, Pa., a corporation of Pennsylvania Application March 16, 1938, Serial No. 196,119

8 Claims. (Cl. 188—203)

This invention relates to motion restraining means adapted to be embodied in mechanisms in which it is desired to restrain certain operating elements against accidental movement from their proper operating position, which mechanisms may include slack adjusters for brake rigging and more particularly that type of slack adjuster in which a rotatable adjusting nut is employed to move a screw threaded adjusting member for either taking up or providing slack, and is in the nature of an improvement in the movement restraining means disclosed and claimed in the pending application of Mortimer B. Cameron, Serial No. 135,617, filed April 8, 1937, which has matured into Patent No. 2,128,037, August 23, 1938.

The principal object of the present invention is to provide an improved motion restraining means for mechanisms adapted to prevent accidental relative movement between certain parts of the mechanisms and which is adapted to be rendered effective to permit intentional movement of the parts.

The motion restraining means disclosed in the aforementioned pending application embodies a latching mechanism which is adapted to restrain the adjusting mechanism of a slack adjuster against movement in either the direction to take-up slack or in the direction to provide slack. The present invention contemplates the elimination of all latch means, and with this in mind, another object of the invention is to provide a friction mechanism for restraining accidental movement of certain parts of the slack adjuster against rotation in either the slack take-up direction or the slack providing direction.

Other objects and advantages will appear in the following more detailed description of the invention.

In the accompanying drawings Fig. 1 is a side elevational view, partly in section, of a slack adjuster embodying the invention; and Figs. 2 and 3 are cross sectional views taken along the lines 2—2 and 3—3, respectively of Fig. 1.

The restraining mechanism is shown in connection with a slack adjuster which may comprise a casing 1 having at one end spaced arms 2 which are adapted to be attached, at their outer ends, to a brake cylinder or any other desired supporting structure. Disposed between the arms 2 and movable longitudinally thereof is a cross head 3 which is operatively connected at one end to a lever 4 by means of a pin 5, said lever being a part of the brake rigging to be adjusted. The cross head is held against axial rotation in the usual manner by the arms 2.

For the purpose of actuating the cross head a longitudinally movable screw threaded member 6 is provided which has one end attached to the cross head by means of a rivet 7 and through the medium of this connection the cross head will prevent axial rotation of the member.

The other end of the member 6 extends through an opening 8 in a wall 9 of the casing and beyond the wall, has screw threaded connection with a rotatable adjusting nut 10 having a short longitudinally extending annular end portion 12 which is journaled in an annular bearing 13 carried by the casing. The end face of the portion 12 slidably engages the wall 9 of the casing, which wall, in the present embodiment of the invention constitutes a thrust bearing for the nut. The nut for the remainder of its length is of hexagonal form in cross section and is telescoped by the inner end of a rotatable hollow sleeve member 14, the inner surface of the nut receiving portion of the sleeve being made to substantially conform to the shape and dimensions of the telescoped portion of the nut to provide a positive driving connection from the sleeve to the nut.

The portion 12 of the nut, as shown in Fig. 1 provides a shoulder 15 against which the left hand end of the sleeve 14 bears.

The sleeve 14 extends beyond the right hand end of the casing 1 and where it passes through the casing it is journaled in a bushing 16 mounted in the casing, the inner end of the bushing constituting a thrust bearing for the outer end face of an annular collar 17 which is preferably formed integral with the sleeve, which bushing is provided with an outwardly extending flange 18. The portion of the sleeve which projects beyond the casing is provided with an exterior nut portion 19 for engagement by a tool when it is desired to rotate the sleeve by hand.

It is to be noted that since the end of the nut 10 is in thrust engagement with the wall 9 of the casing and the end of the collar 17 is in thrust engagement with the bushing 16, the sleeve 14 is held against longitudinal endwise movement either toward the left hand or toward the right.

The sleeve 14 is provided with the ratchet wheel 20 through the medium of which the sleeve and thereby the nut 10 is adapted to be rotated by means of a fluid pressure motor comprising a cylinder 21 formed by the casing and containing a piston 22 having a stem consisting of a pair of members 23 which are spaced apart to straddle the ratchet wheel and which, at their outer ends, are rigidly connected together by an integral spring seat 24 cooperating with the coil spring 25 seated on the casing. The stem members 23 are also connected together by spaced bridge pieces 26, 27 and 28.

For the purpose of driving the ratchet wheel 20 a pawl 29 is provided which is disposed between the spaced piston stem members 23 and which is pivotally mounted at one end on a pin 30 located adjacent the piston 22 and carried by and bridging the space between the members. The free end of the pawl is shaped to operatively engage the teeth of the ratchet wheel. Intermediate its ends, the pawl is provided with a lug 31 which, when the piston is in its normal position as shown in Fig. 3, is in engagement with a stop 32 incorporated in the casing and which, due to such engagement maintains the pawl out of contact with the ratchet wheel against the opposing pressure of a spring 33 interposed between and engaging the piston and a lug 34 integral with and extending outwardly from the pivoted end of the pawl.

At one side of the piston 22 is a piston chamber 35 which is connected by way of a passage and pipe 36 to the usual slack adjuster port of a brake cylinder, not shown, in a well known manner, to establish communication through which fluid under pressure is adapted to flow to the piston chamber when the brake cylinder piston, in effecting an application of the brakes, uncovers the adjuster port.

At the left hand end of the collar 17, the sleeve 14 is provided with a circular guide flange 37. Extending across the collar in a direction longitudinally of the sleeve 14 are spaced outwardly extending radially arranged lugs 38, 39 and 40 which, at their left hand ends as viewed in Fig. 1 may be integrally attached to the guide flange 97.

Encircling the collar 17 is a friction locking element which is made in the form of a resilient split ring 41 having an outer friction surface which frictionally engages a corresponding friction surface 42 formed interiorly on an annular portion 43 of the casing. This ring is rotatable relative to the casing as will hereinafter more fully appear and is maintained in its proper position by the flange 37 and an annular shoulder 44 formed on the casing portion 43. The ends of the split ring are spaced apart a short distance and one of said ends is provided with an inwardly extending lug or flange 45 and the other end is provided with a similar lug or flange 46. As best shown in Fig. 2 the lug 38 of the sleeve 14 extends between the opposing faces of the lugs 45 and 46 of the friction ring and the lugs 39 and 40 overlap the rear faces of the lugs 45 and 46, respectively. Interposed between and operatively engaging the lug 38 of the sleeve and the lug 45 of the friction ring is a spring 47 and interposed between and engaging the lug 38 and the lug 46 of the friction ring is a spring 48. These springs 47 and 48 are partially compressed so that they will at all times tend to maintain the ring 41 expanded. Normally the springs will maintain the sleeve 14 in a centralized position with relation to the ring 41 as shown in Fig. 2, in which position, there will be clearance space between the lugs 39 and 40 and the respective lugs 45 and 46 of the ring.

It should here be mentioned that the springs 47 and 48, acting through the medium of the lug 38 of the sleeve 14, maintain the ring 41 expanded into close frictional engagement with the surface 42 of the casing with sufficient force that the ring will be maintained against rotation relative to the casing until such time as either of the lugs 45 or 46 is engaged by the respective lug 39 or 40 of the sleeve 14 and sufficient force is exerted on the lug 45 or 46 to slightly contract the ring. The springs 47 and 48 are each of a value sufficient to prevent accidental rotation of the sleeve 14 far enough, under the usual service conditions, to cause either lug 39 or 40 to engage the end of the ring 41, thus insuring against accidental adjustment of the brake rigging.

*Automatic operation of the slack adjuster to take-up slack*

Upon effecting an application of the brakes, if the travel of the brake cylinder piston exceeds the normal travel, which will be the case when there is undesired slack in the brake rigging, the brake cylinder piston will uncover the slack adjuster port to the brake cylinder piston chamber, so that fluid under pressure will flow from this chamber through pipe and passage 36 to the piston chamber 35 of the slack adjuster cylinder. Fluid under pressure thus supplied to the chamber 35 causes the piston 22 and thereby the piston stem and pawl 29 to move inwardly, the spring seat 24 carried by the stem causing the spring 25 to be compressed. As the pawl 29 is thus being moved, the spring 33 interposed between the piston and the arm 34 of the pawl acts to cause the pawl to rotate in a counter-clockwise direction into engagement with a tooth of the ratchet wheel 20. The adjusting motor is now in condition for operation to take-up slack in the brake rigging.

Upon the release of fluid under pressure from the brake cylinder to effect a release of the brakes, the brake cylinder piston in its traverse towards release position first cuts off communication between the brake cylinder piston chamber and the slack adjuster port and consequently the piston chamber 35 of the slack adjuster and then connects this port and thereby the piston chamber 35 to the non-pressure chamber of the brake cylinder which is connected in the usual manner to the atmosphere. Upon the release of fluid under pressure from the piston chamber 35, the spring 25 acts to move the piston stem, pawl 29 carried by the stem and piston 22 to their outer or normal position in which they are shown in Fig. 3, the pawl acting to rotate the ratchet wheel 20 and thereby the sleeve 14 and adjusting nut 10 in a clockwise direction, as viewed in Fig. 3. The nut 10 as it is thus rotated, due to its screw-threaded connection with the member 6 causes the member and thereby the cross head 3 and lever 4 to move a short distance toward the left-hand as viewed in Fig. 1. Thus slack which has developed in the braking is automatically taken up.

It will here be noted taht upon the initiation of the rotary movement of the sleeve 14 by the pawl 29, the lug 38 of the sleeve 14 compresses the spring 48 until such time as the lug 39 of the sleeve engages the lug 45 of the ring 41, at which time the lug 39, due to the continued rotation of the sleeve, causes the lug 45 and the associated end of the ring to be moved toward the other end of the ring, thus contracting the ring. The contracting movement of the end of the ring will be very slight but will nevertheless free the ring of the heavy frictional resistance to which it has been subjected, so that the ring as a whole will now freely move with the lug 39 in the clockwise direction so long as the rotative force is applied to the sleeve.

The rotary movement of the sleeve 14 is limited by the automatic operation of the pawl 29 out of engagement of the ratchet wheel 20 which operation is accomplished in the following usual manner. Before the piston 35 has reached its normal position, the stop 32 of the casing cooperates with the lug 31 of pawl to move the pawl out of engagement with the ratchet wheel so that when the piston is in its normal position the pawl will be maintained out of engagement with the ratchet wheel as shown in Fig. 3.

*Manual operation of the slack adjuster to take-up slack and to provide slack*

When it is desired to take-up slack in the rigging manually, a wrench or other suitable tool is applied to the nut portion 19 of the sleeve and through the medium of the tool the sleeve 14 is rotated in a clockwise direction as viewed in Figs. 2 and 3, the lug 39 of the sleeve engaging the lug 45 and thereby causing the friction ring 41 to be contracted in the same manner as when the sleeve is moved by the pawl 29 and ratchet wheel 20. When the desired adjustment has been made and when the operator releases the sleeve, the sleeve will move in a counter-clockwise direction to its centralized position with relation to the friction ring 21.

If it is desired to provide slack in the brake rigging, as will be the case when new brake shoes are to be substituted for worn ones, the sleeve 14 will be rotated manually in a counter-clockwise direction as viewed in Figs. 2 and 3, the lug 40 of the sleeve engaging the lug 46 on the friction ring 41 and contracting the ring to permit rotation of the ring relative to the casing upon continued rotation of the sleeve 14. When the desired adjustment has been effected and the operator removes the tool from the nut 19 the spring 47 acts to centralize the sleeve with relation to the lugs 45 and 46 of the friction ring 41.

It will be noted from the foregoing description that following each adjustment to either take-up or provide slack the springs 47 and 48 act to maintain the sleeve 14 in its centralized position with relation to the lugs 45 and 46 of the friction ring 41 and also acts to maintain the friction ring expanded into locking frictional contact with the friction surface 42 of the casing. The ring thus expanded is locked against rotation relative to the casing until such time as it is contracted by the action of either the lug 39 or the lug 40, and with the ring thus positioned the springs 47 and 48 to act to prevent accidental rotation on the sleeve 14.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a mechanism, in combination, a stationary part, an element rotatable relative to said part, and friction means for opposing rotation of said element, said friction means comprising a rotatable friction ring normally expanded into frictional locking engagement with said stationary part, yieldable means coacting with said ring and element to normally oppose movement of said element relative to the ring, and ring contracting means on said element normally out of contact with said ring adapted upon rotation of the element relative to the ring with an operating force in excess of the opposing force of said yieldable means to engage and contract the ring to release the ring from its frictional locking engagement with said stationary part.

2. In a mechanism, in combination, a stationary part, an element rotatable relative to said part, friction means for opposing rotation of said element, said friction means comprising a rotatable expansible and contractable ring slidably engaging said stationary member, yieldable means for expanding said ring into frictional engagement with said stationary part for locking the ring against rotation relative to the stationary part, means on said element cooperating with said yieldable means for preventing accidental rotation of the element relative to said ring, and ring contracting means on the element normally out of contact with said ring, adapted, when the operating force applied to said element to effect its rotation relative to the ring is sufficient to overcome the opposing force of said yieldable means, to engage and contract said ring to release the ring from its locking engagement with said stationary part.

3. In a mechanism, in combination, a stationary part, an element adapted to be rotated relative to said stationary part, and friction means for normally opposing rotation of said element, said means comprising a rotatable split friction ring slidably engaging said stationary part, said ring being expansible into locking frictional engagement with said stationary part to lock the ring against rotation relative to the stationary part and being contractable out of such locking frictional engagement, yieldable means normally expanding said ring into locking frictional engagement with said stationary part and cooperating with said element for opposing rotation of the element relative to said ring, and ring contracting means normally out of contact with said ring operative upon the rotation of said element relative to the ring with a force superior to the opposing force of said yieldable means for contracting said ring.

4. In a mechanism, in combination, a stationary part, an element adapted to be selectively rotated in either of two directions relative to said stationary part, and friction means cooperating with said stationary part and element for normally opposing movement of said element in either direction, said means comprising a rotatable split friction ring slidably engaging said stationary part, said ring being expansible into locking frictional engagement with said stationary part to lock the ring against rotation relative to the stationary part and being contractable out of such locking frictional engagement, yieldable means normally expanding said ring into locking frictional engagement with said stationary part and cooperating with said element for opposing rotation of the element relative to the ring in either direction, and ring contracting means normally out of contact with said ring operative upon the rotation of said element relative to the ring in either direction with a force superior to that of said yieldable means for engaging and contracting the ring.

5. In a mechanism, in combination, a stationary part, an element selectively rotatable in either of two directions relative to said part, and a friction mechanism cooperating with said part and element for preventing accidental movement of the element in either direction, said friction mechanism comprising a rotatable restraining member in frictional locking engagement with said stationary part for preventing rotation of the member, means cooperating with said restraining member and rotatable element for opposing accidental rotary movement of the element relative to the restraining member, and means carried by said element normally spaced away from said restraining member operative upon rotation of said element for engaging and actuating the restraining member out of frictional locking engagement with said stationary part.

6. In a mechanism, in combination, a stationary part, an element selectively rotatable in either of two directions relative to said part, and a friction mechanism cooperating with said part and an element for preventing accidental movement of the element in either direction, said friction mechanism comprising a rotatable member which is adapted to be locked through frictional engagement with said stationary part against rotation, yieldable means engaging said member and said element for opposing accidental rotation of the element relative to the member, and means normally out of engagement with said member operative upon rotation of said element relative to the member with sufficient force to overcome the resistance offered by said yieldable means for engaging and unlocking said rotatable member.

7. In a mechanism, in combination, a stationary part, an element selectively movable to either of two directions relative to said part, and friction mechanism cooperating with said part and element preventing unintentional movement of said element in either direction and automatically operative to permit intentional movement of the element, said friction mechanism comprising a member slidably mounted in said stationary part for rotary movement and normally held against said movement through frictional engagement with the stationary part, yieldable means engaging said member and element for opposing accidental rotary movement of the element relative to the member, and means normally out of engagement with said member operative upon rotation of said element with sufficient force to overcome the opposition offered by said yieldable means for engaging and releasing said member from its holding frictional engagement with said stationary part.

8. In a mechanism, in combination, a stationary part, an element adapted to be selectively rotated in either of two directions relative to said stationary part, and friction means cooperating with said stationary part and element for normally opposing movement of said element in either direction, said means comprising a rotatable split friction ring slidably engaging said stationary part, said ring being expansible into locking frictional engagement with said stationary part to lock the ring against rotation relative to the stationary part and being contractable out of such locking frictional engagement, a lug on said element extending between the ends of said ring, yieldable means interposed between and operatively engaging both sides of said lug and the ends of said ring for opposing rotation of the element relative to the ring in either direction, and means on said element and operative thereby for contracting said ring, said means being normally maintained out of contact with said ring by said yieldable means acting through said lug, and being movable relative to the ring into operative engagement with the ring when the actuating force applied to the element exceeds the opposing force of the yieldable means.

FRANK E. MILLER.